United States Patent
Christensen et al.

(10) Patent No.: US 7,286,952 B1
(45) Date of Patent: Oct. 23, 2007

(54) METHOD FOR TESTING SUBSCRIBER ACCESS LINES

(75) Inventors: Svend Christensen, Puchheim (DE); Ludwig Dirscherl, München (DE); Ulrich Liefländer, Alling (DE); Hans-Werner Rudolf, Saverne (FR); Franz Schmöller, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,563

(22) PCT Filed: Sep. 27, 1999

(86) PCT No.: PCT/DE99/03101

§ 371 (c)(1),
(2), (4) Date: Oct. 5, 2005

(87) PCT Pub. No.: WO00/19690

PCT Pub. Date: Apr. 6, 2000

(30) Foreign Application Priority Data

Sep. 30, 1998 (DE) ................................ 198 45 072

(51) Int. Cl.
*G05F 19/00* (2006.01)
(52) U.S. Cl. ..................................... 702/122; 455/67.11
(58) Field of Classification Search ................ 702/122, 702/182–185, 188; 455/67.11
See application file for complete search history.

(56) References Cited

U.S. PATENT DOCUMENTS

| 5,202,882 | A | | 4/1993 | Rudolf | |
|---|---|---|---|---|---|
| 5,615,225 | A | | 3/1997 | Foster et al. | |
| 5,680,391 | A | * | 10/1997 | Barron et al. | 370/241 |
| 5,802,105 | A | | 9/1998 | Tiedemann, Jr. et al. | |
| 5,889,837 | A | * | 3/1999 | Sands | 379/27.06 |
| 5,974,115 | A | * | 10/1999 | Chan et al. | 379/27.01 |
| 6,169,883 | B1 | * | 1/2001 | Vimpari et al. | 455/67.11 |

FOREIGN PATENT DOCUMENTS

| EP | 0 451 759 B1 | 10/1991 |
|---|---|---|
| EP | 0451759 | 10/1991 |
| EP | 0 563 677 | 10/1993 |
| EP | 0 563 677 A1 | 10/1993 |
| EP | 0 580 888 | 2/1994 |
| EP | 0 580 888 B1 | 2/1994 |
| EP | 0 643 519 B1 | 3/1995 |

(Continued)

OTHER PUBLICATIONS

Digital Signal Processing and the Emerging Markets of the '90's; Engineering Technology, pp. 74-82.
Siemens "Information Zugangstechnik Integrierte Teilnehmerleitungsprufung (ILTF) A30808-X2731-J630-1-29" (pages 1-8).

(Continued)

*Primary Examiner*—Edward Raymond
(74) *Attorney, Agent, or Firm*—Bell, Boyd & Lloyd LLP

(57) ABSTRACT

A method for testing subscriber access lines wherein the test is carried out locally, online and virtually all the time with the assistance of the digital signal processor for the subscriber line. The test results are gathered at a central point and are signaled from there; when required, to specific locations in the subscriber access network, for example, to a distribution node where maintenance work is currently being carried out.

6 Claims, 1 Drawing Sheet

| | FOREIGN PATENT DOCUMENTS | |
|---|---|---|
| EP | 0643519 | 3/1996 |
| JP | 62-021244 | 2/1987 |
| JP | 63-015556 | 1/1988 |
| JP | 05-292188 | 11/1993 |
| JP | 5097156 | 12/1993 |
| JP | 06-232968 | 8/1994 |
| JP | 08-084189 | 3/1996 |

OTHER PUBLICATIONS

Siemens "ESWD" Digitales Elektronisches Wahlsystem Instandhaten von Teilnehmeranschlussen Systemfunktions-Beschreibung A30808-X2704-L-1-18 (pages 1-82).

Siemens "Information Zugangstechnik Instandhalten von Teilnehmeranschlussen A30808-X2704-L3-1-18" (pages 114).

* cited by examiner

METHOD FOR TESTING SUBSCRIBER ACCESS LINES

BACKGROUND OF THE INVENTION

The present invention relates to a method for testing subscriber access lines, together with an associated subscriber line circuit and a connected subscriber terminal in a digital telecommunications system.

Until now, subscriber lines have been tested predominantly using central test facilities which are switched on by setting up a test connection to the relevant subscriber line. As such, these tests are carried out routinely only at relatively long time intervals, which are in the order of magnitude of weeks or even months. In practice, therefore, a very high percentage of faults which occur originate from customer complaints which, depending on the nature of the fault, are often made a considerable time after a fault was originally found. This makes it considerably more difficult to organize fault rectification as quickly as possible.

However, it is also already known for subscriber line circuits whose functions are at least partially provided by using a digital signal processor to use this digital signal processor for evaluating line parameters and, thus, for carrying out tests as well (European Patent Application 0 451 759 A3). In the case of the known solution, access points to the transmission path and to the reception path of the subscriber line are provided at which voltages occur during operation of the subscriber line circuit which are evaluated in different combinations to produce a specific test result.

Thus, here, the testing of subscriber access lines is localized and can be carried out online. Owing to the performance of modem digital signal processors, their utilization level is well below full load when carrying out subscriber access functions.

With the known test concept that has been mentioned, it is possible to carry out a number of different test functions to identify malfunctions virtually all the time, automatically and successively. The term virtually all the time encapsulates the difference between this and a continuous test determination, which results firstly from the fact that a digital signal processor (as mentioned) has another main task in this context and secondly from the fact that it is likewise responsible for a number of subscriber lines; therefore, being available to the individual lines only in the time-division multiplex mode.

Thus, as a rule, such integrated test systems allow faults in the subscriber access area to be identified and, depending on the nature of the fault, possibly even to be rectified before they have been noticed by the customer. An object of the present invention, therefore, is to utilize the capabilities of such an integrated test concept to further enhance customer usefulness.

SUMMARY OF THE INVENTION

According to the present invention, the test result data, which determined locally in the known manner, is gathered at a central point while observing specific selection criteria and, in specific requirement situations, is transmitted to specific locations in the subscriber access area with which the subscriber access lines are associated.

When the method according to the present invention is used, the functional tests on an individual subscriber line can be carried out at intervals of minutes.

In an embodiment, test data results gathered at a central point are transmitted to the location at which defect-rectification measures are currently being carried out, provided they relate to the geographical area of interest. This measure results in advantages relating to those defect-rectification and maintenance measures in which there is a risk of causing defects on adjacent subscriber lines; for example, in the case of cross-connection measures. If test result data is available to a maintenance technician immediately after cross-connection of a subscriber access line in a distribution box, with such data relating to the other subscriber access lines which are accessible in this distribution box and also being up to date since the test according to the present invention is carried out virtually all the time, then it is possible to identify such consequential faults, and to rectify them once again at the same time.

In another embodiment, when test result data is transmitted to the location where the defect-rectification measure is being carried out, a time restriction is preferably implemented in addition to the geographical limitation, such that the only test result data transmitted is the data which originated close in time to the time at which the measure was carried out at the defect-rectification location. This allows any causal relationship between the defect-rectification measure and consequential faults to be identified even better.

In a further embodiment, fault signaling is provided for relating to the occurrence of a telecommunications connection to be supplied to relevant telecommunications subscribers, thus informing the subscriber of a functional defect 5 before he finds it out for himself.

Pursuant to another embodiment, such signaling can be carried out, in the case of an outgoing telecommunications connection, during the occurrence of the dialing tone.

In accordance with yet another embodiment, in the case of incoming telecommunications connections, information about the presence of a functional defect is produced in the form of an announcement, with a conference connection being set up for this purpose.

Additional features and advantages of the present invention are described in, and will be apparent from, the following Detailed Description of the Invention and the Figures.

DETAILED DESCRIPTION OF THE INVENTION

Figure 1:
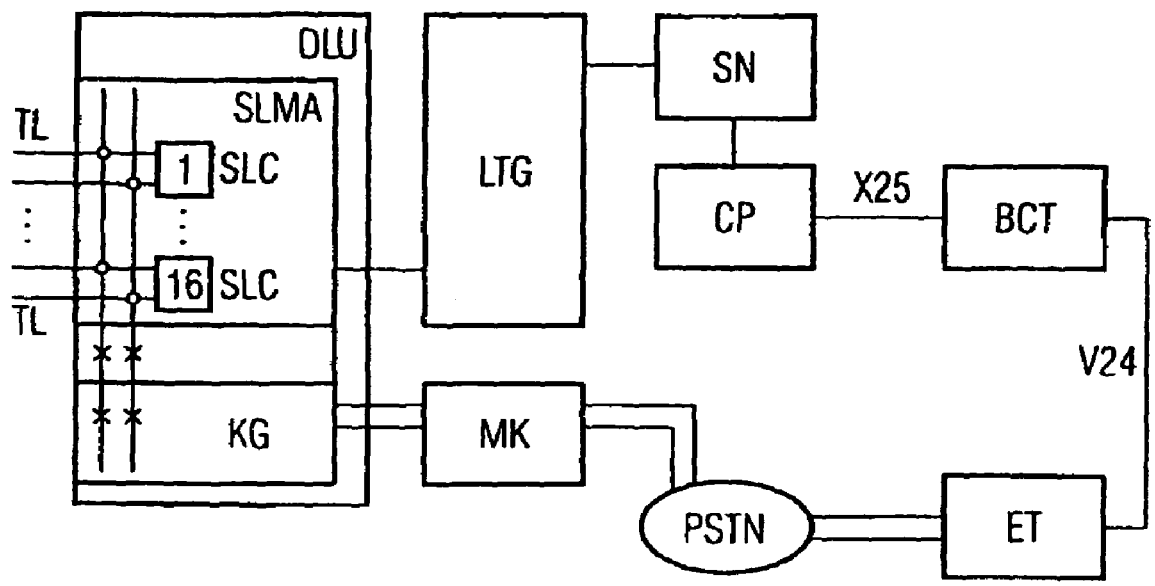
FIG. 1 shows the block diagram of a telecommunications switching system, in which the line test is carried out centrally.

FIG. 1 shows a so-called digital subscriber line unit DLU, a line trunk group LTG, a central switching network SN and a central coordination processor CP as the major components of a telecommunications switching system.

The digital subscriber line unit DLU is connected to subscriber lines TL which are connected to subscriber terminals that are not illustrated here. In practice, there may be up to 1000 lines here. Furthermore, other access lines also may be connected for connection to private branch exchange systems to which a corresponding situation to that relating to use of the method according to the present invention applies, although this will not be described any further in the following text.

In the digital subscriber line unit DLU, the subscriber lines open into subscriber-line-specific subscriber line circuits SLC. In the present case, 16 such subscriber line circuits are, in each case, combined to form a subscriber line module assembly SLMA.

In practice, there are a large number of such digital subscriber line units which may be arranged remotely or in the area close to the switching center. In one implemented embodiment, they are connected to two of the line trunk groups LTG in each case, for reliability reasons.

A common measurement device MK is provided for centralized testing of the subscriber lines TL together with the subscriber terminals connected to them and the line-specific subscriber line circuits SLC. The optional connection of this measurement device to the subscriber-specific components is provided via a coupler assembly KG in the digital line unit DLU.

In order to carry out tests on the parts via the measurement device MK, test connections are set up to an external test system ET and are routed via the telecommunications network PSTN, which is also part of the telecommunications switching center, part of which is illustrated and described.

FIG. 1 also shows a maintenance center BCT associated with the switching center and from where the tests to be carried out are initiated.

The subscriber line circuits SLC essentially carry out the functions of subscriber line supply, overvoltage protection, call supply for reception and transmission of signals from and to the terminals, coding and filtering, and two-wire/four-wire conversion.

Figure 2:
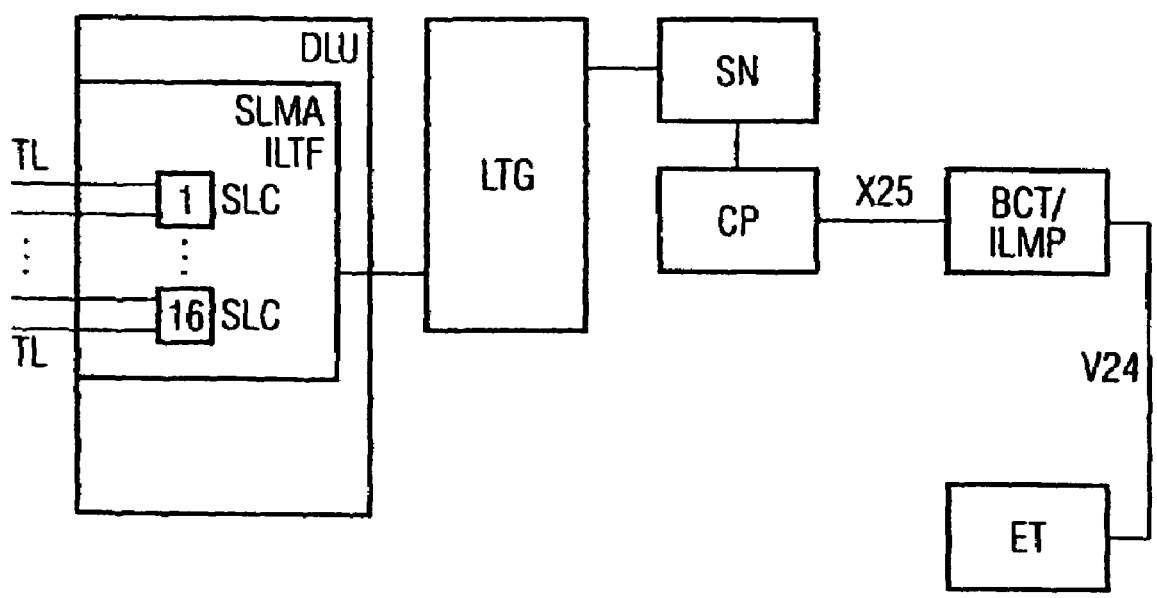
FIG. 2 shows a corresponding illustration of a telecommunications switching system in which the line test is carried out in the manner according to the teachings of the present invention.

In the telecommunications switching center shown in FIG. 2, in which the method according to the present invention is used, it is assumed that some of the functions of the subscriber line circuits SLC, specifically in particular those relating to coding and filtering and two-wire/four-wire conversion, are carried out using a digital signal processor, which can be provided either on a subscriber-specific basis, that is to say as a component of a subscriber line circuit, or for a group of, for example, four or eight subscriber line circuits jointly; i.e., as a component of the subscriber line module assembly SLMA.

Modern digital signal processors are sufficiently powerful that they are not overloaded by the functions relating to the subscriber line. In addition to these tasks, they are therefore used for handling test tasks relating to the subscriber lines, subscriber terminals and subscriber circuits. For this purpose, such signal processors have access via a digital interface to various points in the reception path and the transmission path of the subscriber access line, and can thus evaluate different combinations of voltages occurring at these points and, from this, determine resistance and capacitance values from which it is possible to deduce serviceability or the presence of faults and defects in subscriber access lines; in this context see also the abovementioned European Patent Application 0 451 759 A3.

Thus, in contrast to the situation described with reference to FIG. 1, the test functions are decentralized and are integrated in the subscriber line circuits SLC or in the subscriber line module assemblies SLMA composed of such subscriber line circuits. In FIG. 2, this is indicated by the suffix ILTF (Integrated Line Test Functions) for the designation of the subscriber line module assemblies SLMA.

The locally determined test result data is signaled to the maintenance center BCT/ILMP, where it is gathered. The test results can be evaluated using existing test systems, ET, for which reason one such system is also indicated in FIG. 2. The additional designation ILMP (Integrated Line Maintenance Position) following the designation BCT, referring to the maintenance center, in this case indicates that the test functions are carried out autonomously.

It also can be seen from FIG. 2 that there is no need for any local measurement devices MK or the coupler assemblies required for their connection.

In specific requirement situations, the test result values which have been gathered are transmitted while observing specific selection criteria to specific locations in the subscriber access area associated with those subscriber access lines from which the test results originate.

Such a requirement situation may arise, for example, when effect-rectification or maintenance measures are being carried out on a distribution box. Test result data related to the lines that are accessible there can, according to the present invention, be transmitted to this location where they can be identified via a suitable appliance connected there. Since the test data is determined virtually all the time, the test data is up to date, so that the reaction to defect-rectification measures or maintenance measures which have been carried out, such as cross-connections, can be identified directly in situ. In particular, it is possible to identify the fact that consequential faults have occurred in the course of the measures being carried out, and these then also can be rectified. The unambiguity of any relationship between a measure carried out and the test result obtained can be enhanced by the transmission of test result data being limited to data which has originated close in time to the time at which the measures were carried out.

Alternatively, the test result data can be transmitted from the location where they have been gathered to notify a telecommunications subscriber affected by them of such faults in the course of setting up a telecommunications connection, or while such a connection is in existence.

In the case of an outgoing connection, the fault message can be produced during the occurrence of the dialing tone, and in the case of an incoming connection it can be in the form of an announcement, for which purpose a conference connection is set up, in which the maintenance center is included.

Although the present invention has been described with reference to specific embodiments, those of skill in the art will recognize that changes may be made thereto without departing from the spirit and scope of the invention as set forth in the hereafter appended claims.

We claim as our invention:

1. A method for testing subscriber access lines together with an associated subscriber line circuit and a connected subscriber terminal of a digital telecommunications system, the method comprising the steps of:

providing a digital signal processor on at least one of a subscriber-line-specific basis and a small group of subscriber line circuits;

providing, via the digital signal processor, subscriber-line functions related to telecommunications traffic;

carrying out, via the digital signal processor, a plurality of different test functions to obtain test result data in order to identify malfunctions substantially all the time, automatically and successively;

gathering the test result data at a central point while observing specific selection criteria; and transmitting, in specific requirement situations, the test result data to specific locations in a subscriber access area with which the subscriber access lines are associated.

2. A method for testing subscriber access lines as claimed in claim 1, the method further comprising the step of:

transmitting the test result data to a location at which defect-rectification measures are currently being carried out, provided they relate to a geographical area of interest at this point.

3. A method for testing subscriber access lines as claimed in claim 1, wherein the transmission of the test result data is limited to items which originated close in time to a time at which the defect-rectification measures were carried out.

4. A method for testing subscriber access lines as claimed in claim 1, wherein, if malfunctions are identified, fault signaling relating to an occurrence of a telecommunications connection is supplied to relevant telecommunications subscribers.

5. A method for testing subscriber access lines as claimed in claim 4, wherein the fault signaling occurs during occurrence of a dialing tone in the case of an outgoing telecommunications connection.

6. A method for testing subscriber access lines as claimed in claim 4, wherein, in the case of an incoming telecommunications connection, the fault signaling is an announcement in which an institution emitting the fault message is included, a conference connection being set up for the announcement.

* * * * *